United States Patent [19]

Basset

[11] 3,883,822

[45] May 13, 1975

[54] NEGATIVE RESISTANCE DIODE OSCILLATOR

[75] Inventor: Jean-Raymond Basset, Paris, France

[73] Assignee: Thomson-CSF, Paris, France

[22] Filed: Dec. 10, 1973

[21] Appl. No.: 423,488

[30] Foreign Application Priority Data

Dec. 12, 1972 France .............................. 72.44177

[52] U.S. Cl. ................................ 331/107 R; 331/96

[51] Int. Cl. ............................................ H03b 7/06

[58] Field of Search...... 331/96, 101, 107 R, 107 G, 331/107 T

[56] References Cited

UNITED STATES PATENTS 3,711,792 1/1973 Kaneko et al........................ 331/96

3,803,513 4/1974 Oya et al......................... 331/107 R

*Primary Examiner*—John Kominski

*Attorney, Agent, or Firm*—Karl F. Ross; Herbert Dubno

[57] ABSTRACT

An oscillator comprises a main cavity resonating in accordance with a given wave mode and frequency, and a negative-resistance diode whose axis lies in a transverse plane separating the main cavity from an auxiliary cavity. The auxiliary cavity is terminated in a matched load in order to prevent any risk of parasitic oscillation.

3 Claims, 2 Drawing Figures

NEGATIVE RESISTANCE DIODE OSCILLATOR

The present invention relates to oscillators using negative-resistance diodes.

These oscillators conventionally include a prismatic cavity, formed in a metal body of good conductivity, in which a diode maintains the oscillations of an electromagnetic wave at the resonance frequency of the cavity.

The diode is a Gunn or avalanche diode, for example. The axis of the diode lies in a given plane which splits the cavity, into:

— A main cavity, resonating at a desired frequency and in a desired mode determined by the dimensions and the shape of this main cavity. An external load is supplied with the electromagnetic energy by suitable coupling means.

— An auxiliary cavity whose shape and dimensions are such that its impedance, as seen from the plane containing the diode, is high in relation to that of the main cavity as seen from the same plane. The resonance frequency of the auxiliary cavity differs from that of the main cavity.

Usually, in these known devices the cavities are formed in sections of waveguide and the auxiliary cavity is closed by a short-circuit termination perpendicular to the direction of energy propagation.

The diodes connected across the cavities generally have an impedance whose real part is negative throughout a substantial frequency band. If the resonance frequency of the auxiliary cavity falls within this band, there is the risk of parasitic oscillation developing in this cavity. This parasitic oscillation is then transmitted to the load through the main cavity and produces a substantial power drop at the operating frequency of the oscillator, or indeed a complete disappearance of oscillations at that frequency.

Since it is not possible to dispense with the auxiliary cavity, because its dimensions cannot be reduced to zero, the object of my present invention is to provide means in such a structure for eliminating the risk of parasitic oscillations.

I realize this object, in accordance with my present invention, by making the auxiliary cavity of low Q with the aid of a dissipative load disposed therein, the spacing of this load from the diode plane common to both cavities being substantially less than the spacing of that plane from an output end of the resonant main cavity, this latter spacing being substantially equal to half a wavelength at the operating frequency to which the main cavity is tuned.

Figure 2:
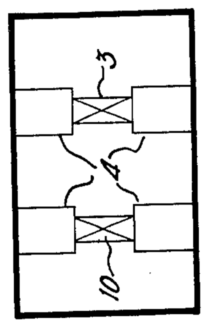
Figure 1:
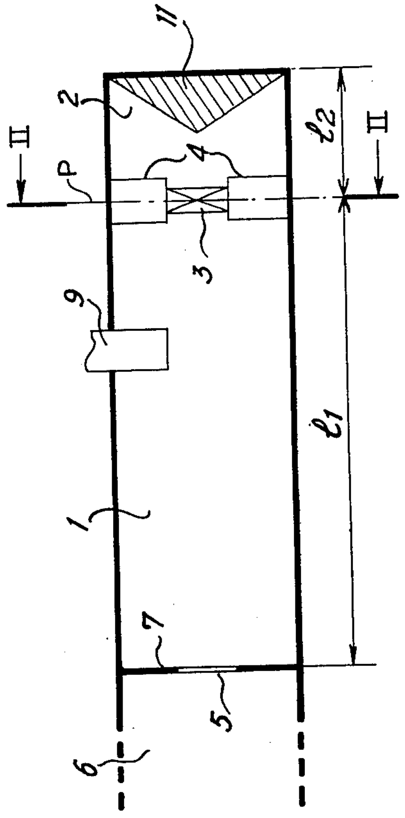

The invention will be better understood from a consideration of the ensuing description given with reference to the accompanying drawing in which:

FIG. 1 is a longitudinal sectional view of an oscillator in accordance with the invention, and FIG. 2 is a cross-sectional view of the oscillator of FIG. 1 taken on the line II—II thereof.

The oscillator shown in the drawing includes a prismatic main cavity 1 of length $l_1$ formed in a rectangular waveguide section. The wavelength corresponding to the resonance frequency of this cavity is $\lambda_g \approx 2l_1$ in the $TE_{01}$ mode. A diode 3 of the negative-resistance type is arranged at one end of this cavity and coupled therewith by means of pillars 4. This axis of the diode lies in a transverse plane P which coincides in FIG. 1 with section line II — II. At the other end of the cavity, an output aperture 5 formed in the wall 7 makes it possible to couple the oscillator to an external load represented by a waveguide section 6. A cylinder 9 of dielectric material or metal, which can be introduced to a greater or lesser extent into the cavity, facilitates to mechanical adjustment of the resonance frequency of the cavity 1. The oscillator comprises in addition a diode 10 of varactor type, visible in FIG. 2, enabling electronic tuning of the main cavity 1. The axis of the diode 10 is parallel to that of the diode 3 and located in the same plane P. The supply circuits for the two diodes have not been shown.

The main cavity 1 is extended by an auxiliary cavity 2, of length $l_2$, terminated in a matched load 11 of the dissipative character.

In continuous operation, the impedance of the main cavity coupled to its load, as reflected into the diode plane P, has a real part whose absolute value is equal to that of the diode 3.

In the auxiliary cavity, the waves propagating towards the matched load 11 are absorbed by the latter. Thus, no parasitic oscillation can develop. The quality factor of this cavity is virtually zero.

The impedance of the cavity 2 terminated in the matched load 11, as reflected into the plane P, is real and very much higher than the impedance of cavity 1 as reflected into the same plane.

The output-power loss introduced by the matched load is therefore practically zero (some thousandths of the power delivered by the oscillator) and the risks of parasitic oscillation are avoided.

Moreover, the length $l_2$ of the cavity 2 is not critical and its size can be reduced to the minimum; it depends only upon the size of the matched load. A space having a length equal to a minor fraction of the wavelength $\lambda_g$ must always be provided between the load and the negative-resistance diode 3 so that operation of the latter is not affected by this load. The length $l_2$ is thus reduced to the sum of the thickness of the load 11 and a minor fraction of the wavelength. The structure of this dissipative load is not critical.

The load 11 is made of a material which absorbs an electromagnetic wave, e.g. a mixture of dielectric and conductive elements, or a resistive metal deposited upon a grounded surface, the thickness of the deposit being such that the resistance which it presents is sufficient to dissipate the waves arriving there.

It is not necessary for the standing-wave ratio of this kind of load to be strictly equal to unity. A standing-wave ratio of less than 2 will suffice. Any other type of dissipative load can be utilized provided this condition is met.

The invention is applicable to any resonant-cavity oscillator, whatever its operating frequency.

What is claimed, is:

1. An oscillator comprising:

a metallic body formed with a prismatic main cavity, resonant at a predetermined operating frequency, and an adjoining low-Q auxiliary cavity constituting an extension of said main cavity, said cavities meeting at a common transverse plane;

a negative-resistance diode with an axis in said plane connected across said cavities, said main cavity having an output end coupled to an external load and spaced from said plane by substantially half a wavelength at said operating frequency; and a dissipative load in said auxiliary cavity separated from said plane by a distance substantially less than the spacing of said plane from said output end.

2. An oscillator as defined in claim 1, further comprising tuning means for said main cavity in said plane adjacent said negative-resistance diode.

3. An oscillator as defined in claim 2 wherein said tuning means comprises a varactor diode.

* * * * *